Figure 1:
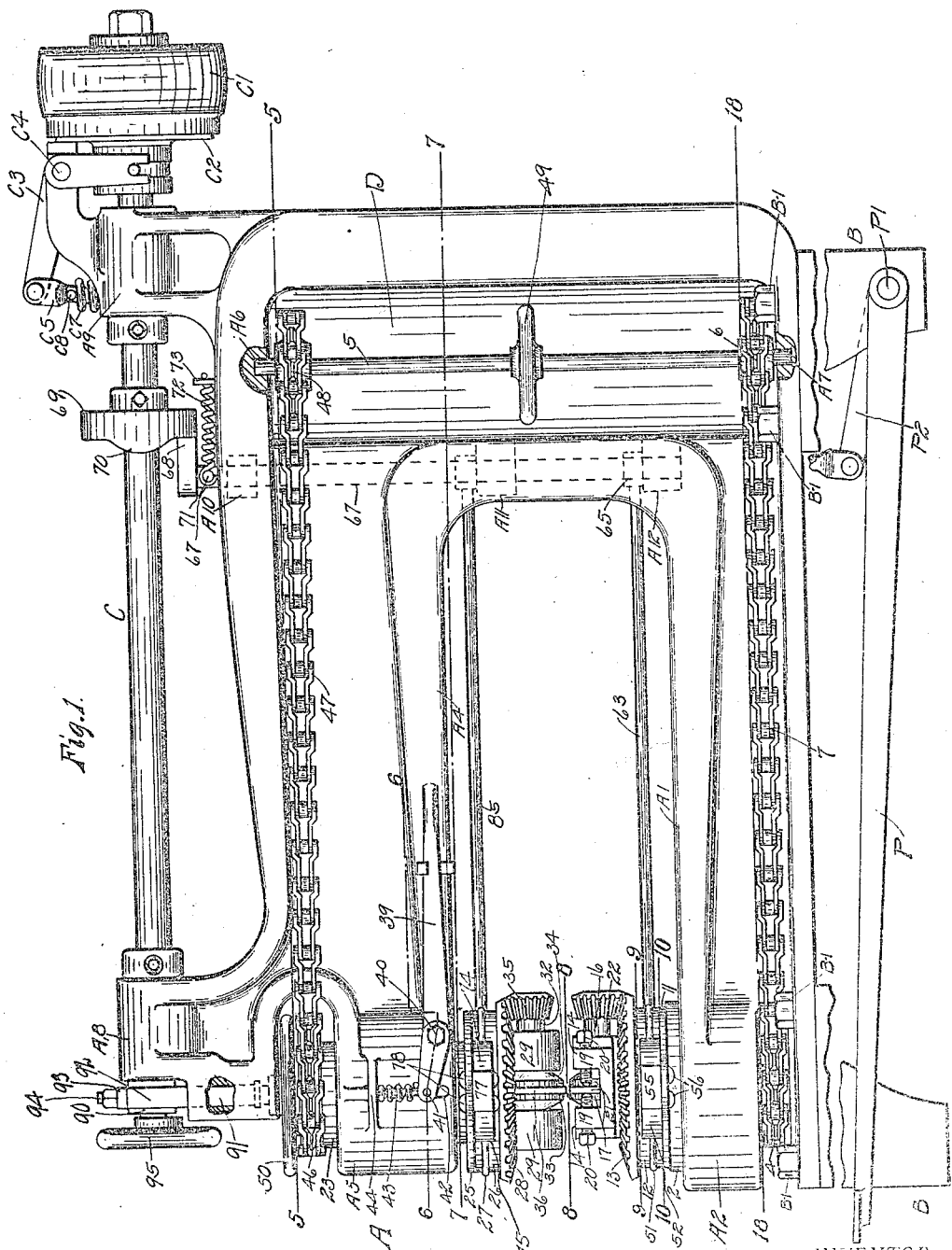

1,155,479.

WITNESSES
Richard Kirkpatrick
Roy S. Myers

INVENTOR
Charles B. Gray
By Cyrus Kehr
Attorney

C. B. GRAY.
MACHINE FOR CUTTING SHEET METAL.
APPLICATION FILED MAY 1, 1913.
1,155,479.
Patented Oct. 5, 1915.
5 SHEETS—SHEET 2.
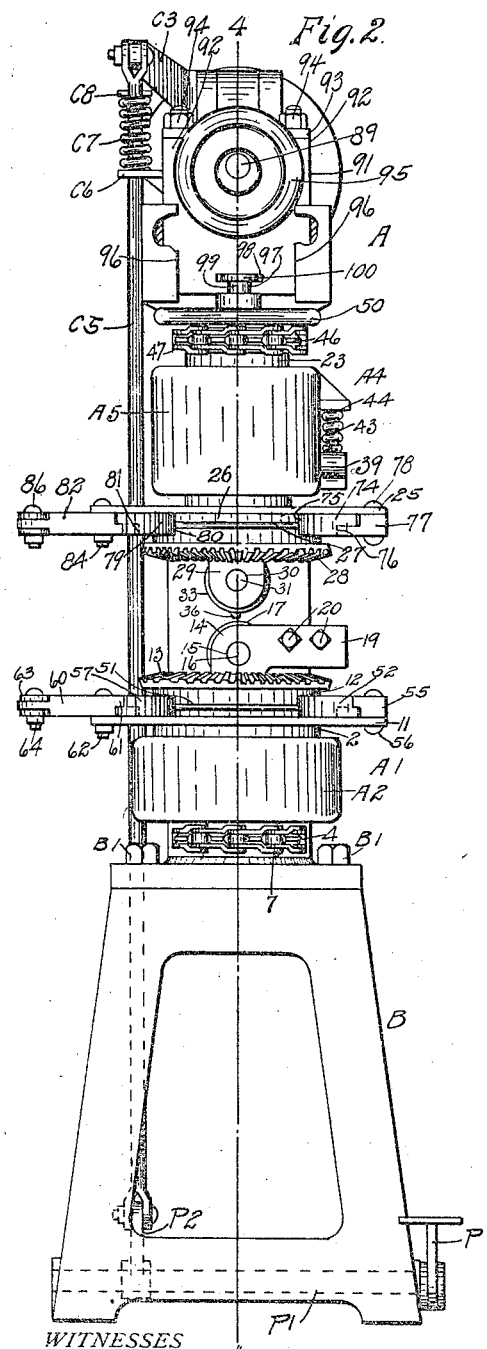
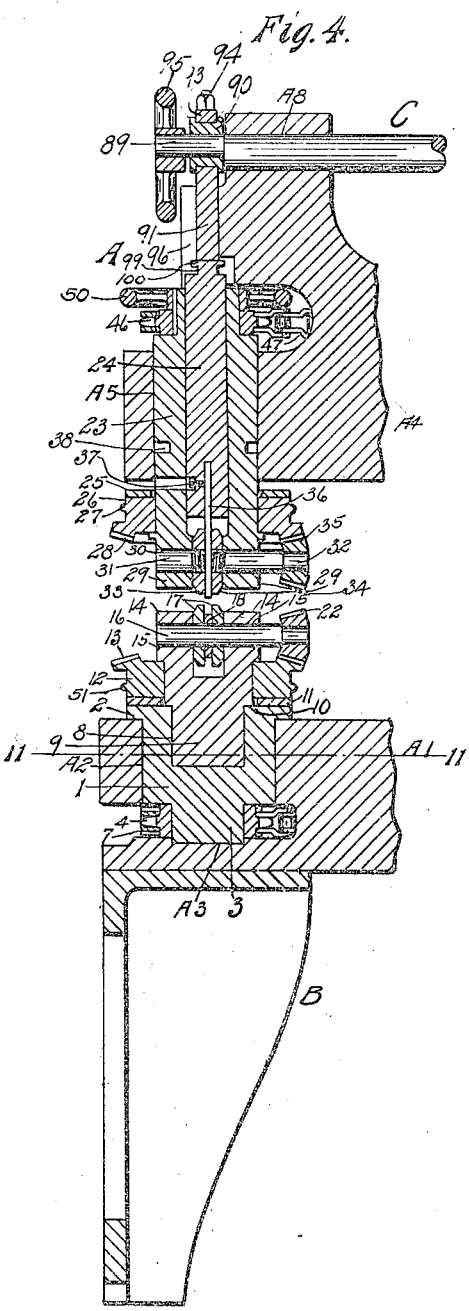

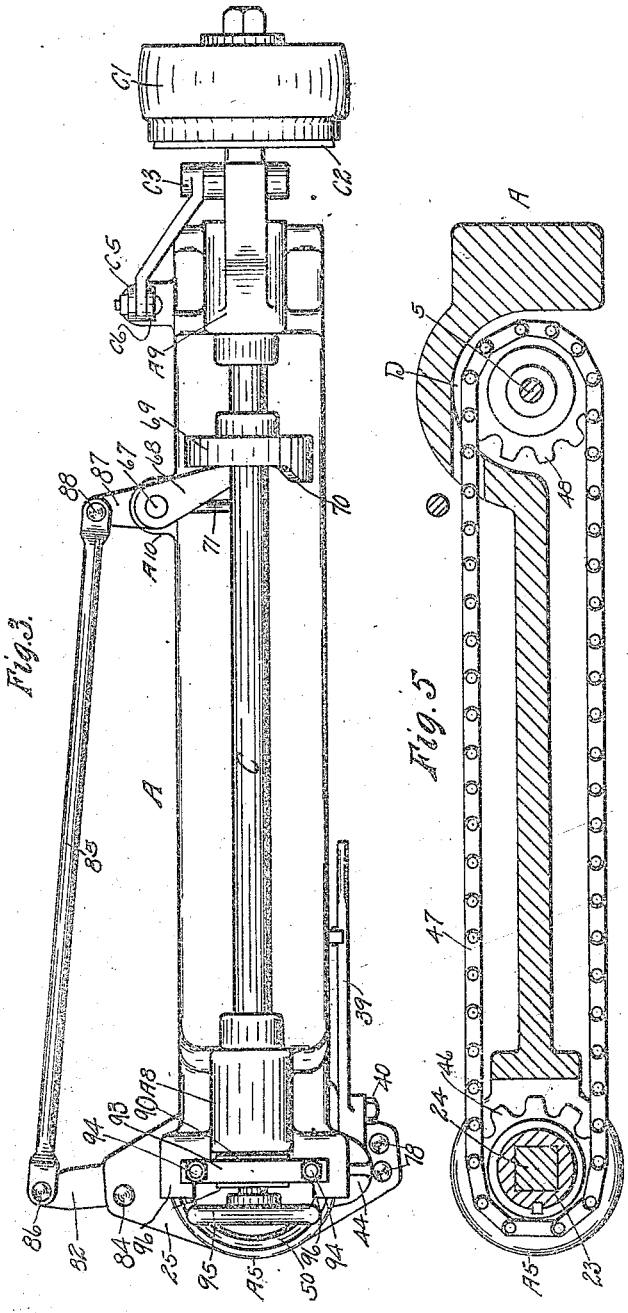

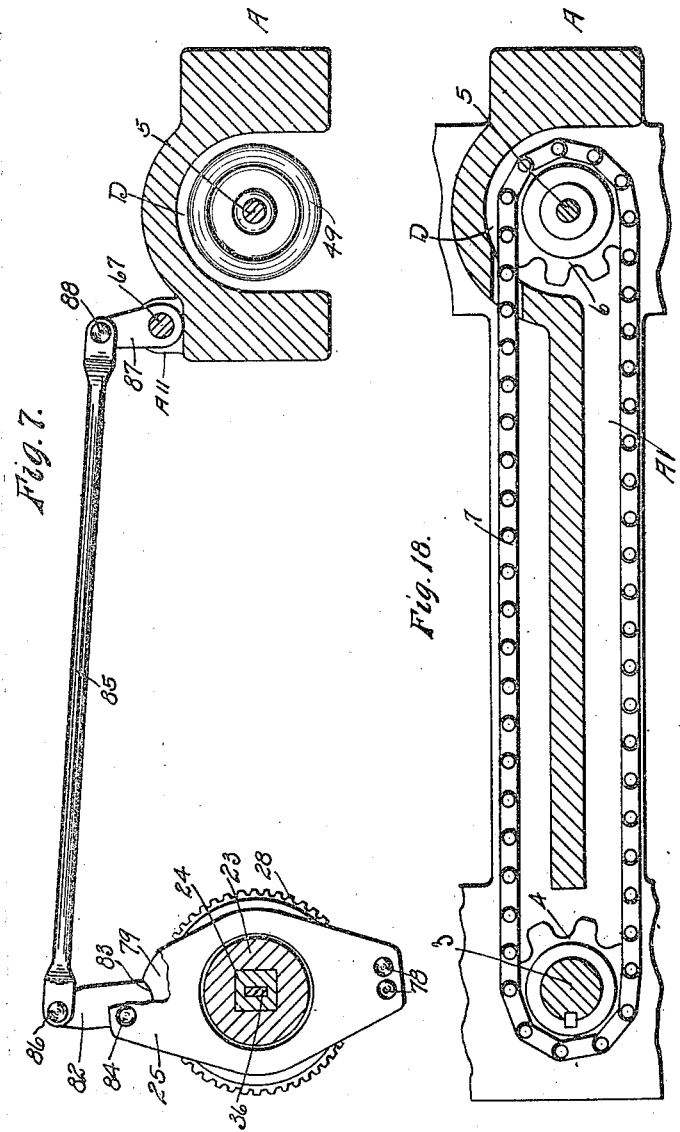

C. B. GRAY.
MACHINE FOR CUTTING SHEET METAL.
APPLICATION FILED MAY 1, 1913.
1,155,479.
Patented Oct. 5, 1915.
5 SHEETS—SHEET 5.
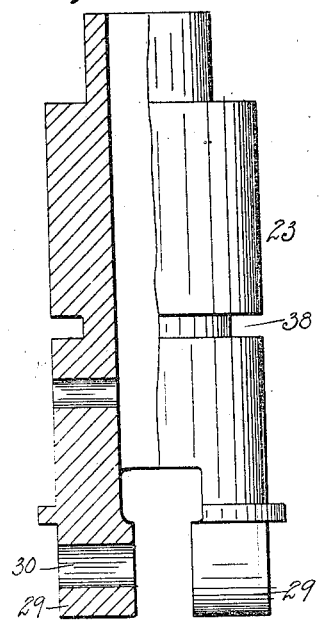
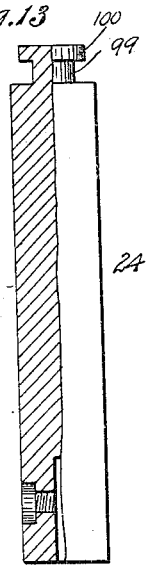
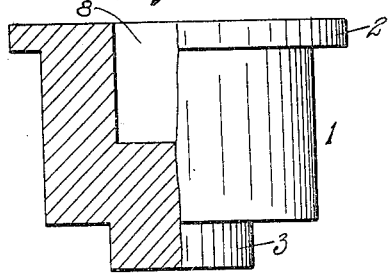
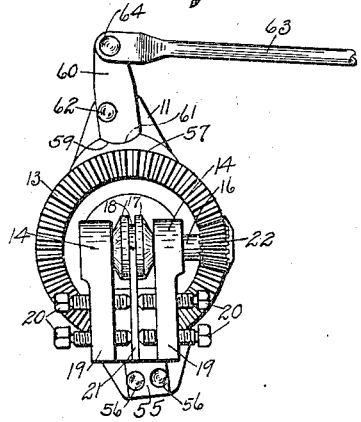
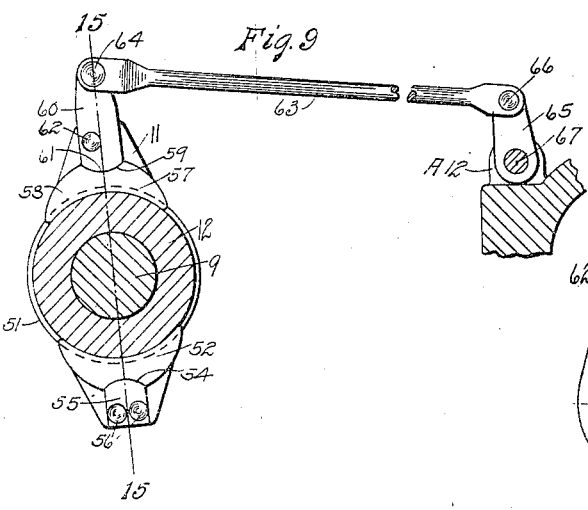
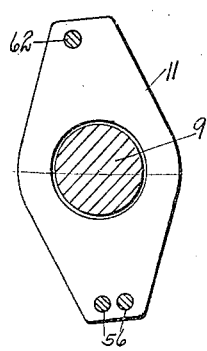
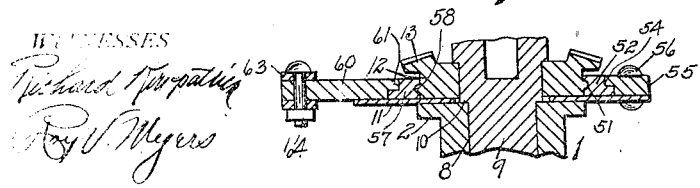
INVENTOR
Charles B. Gray
By Cyrus Kehr
Attorney

UNITED STATES PATENT OFFICE.

CHARLES B. GRAY, OF KNOXVILLE, TENNESSEE.

MACHINE FOR CUTTING SHEET METAL.

1,155,479.

Specification of Letters Patent.

Patented Oct. 5, 1915.

Application filed May 1, 1913. Serial No. 764,836.

*To all whom it may concern:*

Be it known that I, CHARLES B. GRAY, a citizen of the United States, residing at Knoxville, in the county of Knox and State of Tennessee, have invented a new and useful Improvement in Machines for Cutting Sheet Metal, of which the following is a specification, reference being had to the accompanying drawings.

My improvement relates particularly to machines designed for cutting sheet metal on lines which are not straight.

The object of the improvement is to provide a machine for rapidly cutting sheets of metal along lines which are curved or angular or change course so frequently as to prevent the use of shearing machines and to make the use of any shear difficult.

My improved machine comprises means for holding and feeding the sheet and means for cutting through the sheet, which means coöperate in such manner as to allow the guiding of the sheet through the mechanism in the same manner as cloth is ordinarily guided through a sewing machine for stitching along any desired course. In other words, the machine comprises power-driven cutting mechanism and power-driven mechanism for holding and feeding the sheet, and permitting the manual guiding of the sheet while it is so held and fed.

In the form of the machine shown by the drawings, portions of the feeding mechanism are also portions of the cutting mechanism.

Similar machines are described in my Letters-Patent of the United States, No. 1,098,376, and No. 1,098,377, granted June 2, 1914. In the machines of said applications, the operation of the feed mechanism is always in the same direction to carry the sheet from the front toward the rear of the machine, so that the changes in the course of the cutting are made only by turning the sheet with the feed mechanism as a turning point.

In the present machine, the course of action of the feed mechanism, may be changed at the will of the operator so that the course of the cutting may be changed, when so desired, without turning the sheet. But the sheet is still so held by the feed mechanism as to permit its manual turning with the feed mechanism as a turning point, as described in said two applications. The course of the cutting may also be varied by combining a change of direction of the feed and turning the sheet manually. The change in the direction of the feed mechanism is to be used when the sheet is so large or so long as to make it cumbersome for handling or as to prevent its turning through the throat formed between the upper and lower arms of the machine head.

In the accompanying drawings, Figure 1 is a front elevation of a machine embodying my improvement; Fig. 2 is an elevation looking toward the right in Fig. 1; Fig. 3 is a plan of the machine as shown in Fig. 1; Fig. 4 is an upright section on the line, 4—4, of Fig. 2; Fig. 5 is a horizontal section on the line, 5—5, of Fig. 1; Fig. 6 is a section on the line, 6—6, of Fig. 1; Fig. 7 is a section on the line, 7—7, of Fig. 1; Fig. 8 is a section on the line, 8—8, of Fig. 1; Fig. 9 is a section on the line, 9—9, of Fig. 1; Fig. 10 is a section on the line, 10—10, of Fig. 1; detail portions being uncut; Fig. 11 is a section on the line, 11—11, of Fig. 4; Fig. 12 is a detail, sectional view of the barrel in which the upper cutter holder reciprocates; Fig. 13 is a detail view, showing the upper cutter holder; Fig. 14 is a detail view of the barrel which supports the holder for the lower feed members; Fig. 15 is a section on the line, 15—15, of Fig. 9, with portions added; Fig. 16 is a plan of one of the gripping shoes shown in Fig. 9; Fig. 17 is a transverse section of said shoe; Fig. 18 is a section on the line, 18—18, of Fig. 1.

Referring to said drawings, B, B are supports A is a head secured to said supports by means of bolts, B¹. Said head resembles the "head" of a sewing machine. It has a lower arm, A¹, and an upper arm, A⁴. On the outer end of the lower arm is an upright bearing, A², and on the outer end of the upper arm and axially in line with the bearing, A², is a bearing, A⁵. Below the bearing, A², is a smaller socket-form bearing, A³. On the upper portion of the upper arm, A⁴, is a horizontal bearing, A⁸; and on the body of said head is a similar bearing, A⁹, axially in line with the bearing, A⁸.

In the body of the head is an upright recess, D, extending into said head from the front. In the upper portion of said recess is a bearing, A⁶, and in the lower portion of said recess is a corresponding bearing, A⁷, said bearings being upright and axially in line with each other. On the back of the head, adjacent to said recess, D, and at the side of the latter toward the arms, A¹, and, A⁴, the head has upright bearings, A¹⁰, and, A¹¹, and, A¹², which are in axial alinement with each other.

In the bearing, A², rests a barrel, 1. Said barrel is cylindrical and is free to rotate within said bearing. Above the bearing it has a flange, 2, reaching outward across the face of the arm, A¹, surrounding said bearing. At its lower end, said barrel has a cylindrical stub or short shaft, 3, extending into the bearing, A³. The sprocket wheel, 4, surrounds said stub and is keyed thereto, so that said wheel and said barrel must rotate in unison. An upright shaft, 5, has its upper end resting in the bearing, A⁶, while its lower end rests in the bearing, A⁷.

A sprocket wheel, 6, surrounds the lower portion of the shaft, 5, in the same plane with the sprocket wheel, 4, and the wheel, 6, is immovable on said shaft, A, sprocket chain, 7, extending around the two sprocket wheels, 4, and 6, for the purpose of transmitting motion from one of said wheels to the other, so that when the shaft, 5, is rotated, the barrel, 1, is correspondingly rotated.

In the upper portion of the barrel, 1, is a socket, 8, which receives the lower portion of the lower feed member holder, 9. Said socket and the lower portion of said holder are so formed as to permit an upward movement, for removal and as to prevent the rotation of said holder within said socket. The engagement between said holder and the barrel to prevent relative rotation of said members may be accomplished in different ways. For this purpose the drawings show the socket and the lower portion of said holder formed of square cross-section. Immediately above the socket, 8, said holder, 9, has an annular shoulder, 10, resting upon the upper end of said barrel, and limiting its downward movement. Immediately above the barrel, said holder is cylindrical and is loosely surrounded by a shoe ring, 11, which will be described later on. Above said ring, is a gear ring, 12, surrounding said body, and rotatable thereon. A miter gear, 13, is formed upon said ring integral therewith and concentric with the axis of the barrel, 1, the teeth of said gear being inclined outward.

In the upper portion of the holder, 9, and at opposite sides of its axis are two upright ears, 14, each having a bearing, 15, to receive a rotary shaft, 16. Between said bearings two rollers, 17, immovably surround said shaft and are separated from each other by a spacing ring, 18. The adjacent faces of said rollers are at opposite sides of and equidistant from the axis of the barrel, 1. Each of the ears, 14, has a horizontal extension, 19, parallel and opposite to the other of said extensions. Set bolts, 20, extend horizontally through said extensions and bear against the stationary, lower cutter, 21. The cutting end of said cutter extends between the rollers, 17, and over the ring, 18, to the level of the upper portion of said rollers, and to the axial line of the barrel, 1, and it may rest on the ring, 18.

A bevel gear wheel, 22, is mounted on the shaft 16, and meshes with the bevel gear, 13, on the ring, 12, so that when said ring is rotated, the gear wheel, 22, and the shaft, 16, and the rollers, 17, are rotated. Partial rotations are given to said ring by means to be hereinafter described.

In the bearing, A⁵, is a barrel, 23, which is cylindrical and rotatable in said bearing and tubular, the bore being square in cross-section. Within said barrel is the upper tool holder, 24. Said tool holder is also square in cross-section and is reciprocable in said barrel (see Figs. 4 and 6).

Below the bearing, A⁵, the barrel, 23, is loosely surrounded by a ring, 25, which corresponds to the ring, 11, resting immediately above the barrel, 11. Directly below the ring, 25, is a gear ring, 26, surrounding and rotatable on the barrel, 23, and forming a support for the ring, 25.

On the ring, 26, is an annular rib, 27, serving a purpose to be described farther on. On the lower portion of the ring, 26, is an annular bevel gear, 28, meshing with another gear to be described farther on.

Below the ring, 26, the barrel 23, has two downward directed ears, 29, each having a horizontal bearing, 30. Each of said bearings is in axial alinement with the other, and parallel to the bearing, 15. In one of the bearings, 30, is a shaft, 31, extending toward the other bearing. In the other bearing, 30, is a similar shaft 32, extending nearly to the shaft, 31, and having on its outer end a bevel gear wheel, 35, immovable on said shaft and meshing with the annular bevel gear, 28. On the shaft, 31, between the ears, 29, a roller, 33, surrounds the shaft, 31, and is secured immovably thereto. On the adjacent end, 32, the roller, 34, surrounds the shaft 32, and is immovably secured thereto. In the space between the rollers, 33 and 35, is an upper tool or cutter, 36. Its upper end extends into the upper tool holder, 24, and is secured by the setbolt, 37, made accessible through an opening in the barrel, 23.

The rollers, 33 and 34, are separated sufficiently to allow free reciprocation of the cutter, 36, between said rollers; and the thickness of the lower portion of said cutter in a direction parallel to the shafts, 31, 32, and 16, is such as to make its lateral edges pass downward between the lower rollers, 17, 17, in such proximity to the adjacent edges of said rollers as to make said edges act in opposition to the adjacent edges of the upper cutter in cutting a sheet placed between said lower rollers and said upper cutter.

The upper barrel, 23, constitutes a rotatable support which surrounds the upper cutter for the rotation of the latter with said support on an axis which is perpendicular to the plane of the sheet. The lower barrel, 1, constitutes a rotatable support for the lower cutters, the rotation of said support being on the axis of said upper support. The upper barrel, 23, is normally pressed downward by the spring, 43, so that the rollers, 33 and 34, will bear upon the upper face of a sheet of metal resting upon the lower rollers, 17, 17.

The upper cutter, 36, is so set with reference to the lower cutter, 21, as to pass downward below the cutting edge of the cutter, 21, in such proximity thereto as to work in opposition to the forward cutting edge of the upper cutter for cutting. Thus provision is made for cutting on two parallel side lines and on a cross line extending from one of said side cuts to the other. Within the bearing, $A^5$, the barrel, 23, has an exterior, annular groove, 38. On the front side of the arm, $A^4$, is a hand lever, 39, mounted on a horizontal axis, 40, extending forward on the bearing, $A^5$. Said lever has a wrist pin, 41, extending through an upright slot, 42, formed in the bearing, $A^5$, into the groove, 38. By tilting the hand lever, 39, so as to move the wrist pin, 41, up and down, the barrel, 23, will be moved up and down in the bearing, $A^5$. It will be observed that this may be done while said barrel is rotating or regardless of the particular position into which said barrel has been turned. While the barrel is being turned, the wrist-pin remains stationary in the groove, 38, and the expanding coiled spring, 43, is placed between the short end of the hand lever, and the bracket, 44, extending outward from the bearing, $A^5$, above said hand lever. Said spring serves to normally press the barrel, 23, downward, so as to cause the rollers, 33, and 34, to bear downward upon a sheet of metal resting upon the rollers, 17, the degree of said downward pressure of the rollers, 33 and 34, depending upon the strength of the spring, 43. When the pressure of said rollers, 33 and 34, upon the sheet of metal is to be diminished, or eliminated the end of the hand lever, 39, is pulled downward.

Above the bearing, $A^5$, a sprocket wheel, 46, surrounds and is immovably secured to the upper end of the barrel, 23. On a level with said sprocket wheel, a sprocket wheel, 48, surrounds and is immovably secured to the upright shaft, 5, on which is the sprocket wheel, 6. A sprocket chain, 47, surrounds the two sprocket wheels, 46. and 48. The sprocket wheels, 46 and 48, and 6, are made of suitable relative sizes to compel the rotation of the wheels, 46 and 4, and consequently the barrels 23 and 1, simultaneously and at the same velocity—in unison or synchronously; and it will be observed that the relation of said barrels to the shaft, 5, is such as to compel said barrels to turn in the same direction as well as synchronously. By this means the shaft, 16, is kept parallel to the shafts, 31 and 32, and the relation of the rollers, 17, 33 and 34, relative to the upright plane passing between the rollers, 33 and 34, and also between the rollers, 17, 17, is maintained.

As has already been stated, the two lower rollers, serve as lower cutters at each side of the upper cutter. Furthermore, said rollers and the two upper rollers serve as members for supporting and feeding the sheet of metal lying between the two pairs of said rollers. Said sheet is "fed" when said rollers bear against the faces of the sheet and are turned or partially turned so as to move their adjacent faces or edges in the same direction. The lower rollers turn in one direction and the upper rollers turn in the other direction. In the form of the mechanism illustrated by the drawings this "feed" may be said to be accomplished mainly by only two of the rollers, the upper roller, 34, and the corresponding lower roller, 17; for by driving the lower shaft, 16, the two lower rollers are positively driven; while provision is made for driving only the upper shaft, 32, and the upper roller, 34, the upper roller, 33, turning idly on account of frictional engagement with the sheet of metal.

In the operation of this machine the upper cutter is arranged for making cuts chisel-fashion from the sheet. These cuts are relatively short, and the sheet is to be fed forward a corresponding distance or step during each elevation of the upper cutter. Hence the rollers, 17, 17 and 33 and 34, are to be rotated so as to carry their opposing edges through a correspondingly short distance during the elevation of the upper cutter. This rotation of these rollers must be in unison and through the same number of degrees. Said partial periodical rotation is effected by back-and-forth rotations of the rings, 11 and 25, and the engagement of gripping shoes mounted on said rings with the bevel gear rings, while the rings, 11 and 25, are moving in one direction, such back-and-forth movements of the rings, 11 and 25, being effected by a cam and other members forming operative relation between the drive-shaft and rings, 11 and 25, which cam and other members will be next described. On the ring, 11, rests a gripping shoe, 52, which is curved to conform to the curvature of the ring, 12. On the latter is an annular rib, 51, and the shoe has a groove, 53, to receive said rib. The upper, outer portion of said shoe has a recess, 54, which receives the upper portion of a retaining bracket, 55, which rests upon and is immovably secured to the ring, 11, by means of bolts or rivets, 56. The bracket holds the shoe loosely so as to allow it to adapt itself to the adjacent surface of the ring, 12. By extending into the recess, 54, the bracket, 55, holds the shoe against sufficient endwise movement to become released. The ring, 11, is so turned as to bring the shoe, 52, to the front of the machine.

On the rear portion of the ring, 11, is a similar gripping shoe, 57, having a groove, 58, to receive the rib, 51, and having in its upper, outer portion a recess, 59, which receives a cam, 61, on a cam block, 60, hinged to the ring, 11, by an upright bolt, 62, said bolt being set to bring the extended portion of the cam toward the shaft, 67, so that when the free end of the eccentric block, 60, is drawn toward said shaft, the cam will press the shoe, 57, against the ring, 12. When that is done, the ring, 11, being a little larger inside than the external diameter of the ring, 12, will be shifted rearward so as to press the shoe, 52, rearward against the ring, 12. In this manner, both gripping shoes are made to bear firmly against the ring, 12. The parts are so proportioned as to effect such gripping directly after the cam block begins movement toward the shaft, 67, or toward the right, as viewed in Figs. 1 and 3, so that during the continuation of such movement of the cam block, the ring, 12, will be turned in unison with the shoes. The gear ring, 12, being loose on the holder, 9, it turns on said holder and rotates the bevel gear, 22, and the latter partially rotates the shaft, 16, and the rollers, 17, 17.

A link, 63, is coupled by one end to the cam block, 60, by means of a bolt, 64, and by its other end to an arm, 65, by a bolt, 66. Said arm is rigid on and extends rearward from the shaft, 67. Said shaft rests in bearings, $A^{10}$, $A^{11}$, and $A^{12}$. On the main drive shaft, C, and rightward of the shaft, 67, is a cam wheel, 69, having its working face directed toward said shaft and having an extension, 70. On the upper end of the shaft, 67, is an arm, 68, directed forward into the path of the extension, 70, of the cam wheel. Below the arm, 68, is an arm, 71, also rigid on the shaft 67, and directed forward. At the right of the arm, 71, is a hook, 73, sealed on the head, A. A contracting coiled spring, 72, is joined by one end to said hook and by its other end to the arm, 71, and constantly pulls said arm toward the right, whereby the arm, 68, is constantly drawn toward or against the working face of the cam wheel, 69. These several parts are so placed and proportioned as to cause the leftward movement of the link, 63, when the cam extension, 70, is not opposite the arm, 68. That position of the link, 63, turns the cam block, 60, so as to release the cam, 61, from the shoe, 57. This leaves the gear ring, 12, free from the gripping shoes and may be regarded as the normal condition.

The gripping mechanism above described as being applied to the shoe ring, 11, is duplicated on the shoe ring, 25, which surrounds the upper barrel, 23, excepting that the parts are turned bottom-side-up and applied to the lower side of the ring, 25. The gripping shoe, 74, corresponds to the lower gripping shoe, 52; and said shoe has a groove, 75, and a recess, 76, corresponding, respectively, to the groove, 53, and the recess, 54, on the shoe, 52. The retaining bracket, 77, and the bolts or rivets, 78, correspond, respectively, to the retaining bracket, 55, and the bolts or rivets, 56. The gripping shoe, 79, corresponds to the lower gripping shoe, 57, and the groove, 80, and the recess, 81, correspond, respectively, to the groove, 58, and recess, 59, of the shoe, 57. The cam block, 82, and its cam 83, correspond to the cam block, 60, and its cam, 61. The bolt, 84, link, 85, bolt, 86, arm 87, and bolt, 88, correspond, respectively, to the bolt, 62, link, 63, bolt, 64, arm 65, and bolt 66. The gripping shoe, 74, is a duplicate of the gripping shoe, 52, illustrated in detail by Figs. 16 and 17, and said figures will serve as an illustration of shoe, 74.

It is to be observed that the gripping shoes, of the gripping mechanism above described, are normally out of engagement with the adjacent gearing, 12 and 26, whereby the barrels, 1 and 23, are left free to be turned without resistance from the gripping mechanism. On the shaft, 5, is a hand wheel, 49, to be used for turning said shaft when it is desired to rotate said barrels to change the direction of feed. A similar hand wheel, 50, surrounds the upper portion of the barrel, 23. When said wheel is turned by the hand of the operator, rotation is imparted to the barrel 23, and motion is transmitted from the latter through the sprocket chain, 47, to the shaft, 5, and through the latter to the sprocket chain, 7, and the lower barrel. On the left hand end of the shaft, C, above the barrel, 23, said shaft has a crank, 89, on a short radius. Below said crank is an upright cross head, 91, having upward extensions, 92, rising above the crank, 89. A bearing block, 90, surrounds said crank between said extensions, 92. The space between said extension is free to allow lateral movement of said block during the revolutions of said crank. A bridge plate, 93, extends across said bearing block and has its ends resting upon the extensions, 92, and secured thereto by screw bolts, 94. Said bridge plate holds said bearing block down against the body of the cross head, so that during the upward and downward movement of the barrel during the revolutions of the crank, the cross head will be moved up and down a distance equaling twice the radius of said crank. The cross head is confined by upright flanges, 96, on the front portion of the upper arm, A⁴. The lower portion of the cross head has an upright slot, 97, to receive the cylindrical neck, 99, formed on the upper end of the tool holder, 24; and above the slot, 97, is a cross slot, 98, opening into the slot, 97, and receiving the cylindrical head, 100, formed on the upper end of the neck, 99. Said slots are formed to fit closely to said neck and said head, in order that said tool holder must move in unison with the cross head in its up-and-down movement. The neck, 99, and the head, 100, are formed on the axis of the barrels, 23 and 1; and since said neck and head are cylindrical, the tool holder is free to turn by the rotation of the barrel, 23, without disturbing its engagement with the cross head.

A hand wheel, 95, is mounted immovably on the crank, 89, preferably concentric with the shaft, C. When the shaft, C, is disconnected from its source of power, said hand wheel may be turned by the operator for turning said shaft and the crank to bring the tool holder, 24, into any desired position.

For transmitting motion to the shaft, C, a clutch pulley, C¹, receives a belt, not shown. Said pulley is loose on said shaft and is one member of a clutch. C² is the movable member of said clutch, being keyed on the shaft, C. A bell crank fork, C³, pivoted at C⁴ to the head, A, engages the clutch member, C², for shifting a link, C⁵, coupled to the free end of the fork, C³, and extends downward and has its lower end coupled to an arm, P², which is rigid on a rock shaft, P¹. On said shaft is a pedal, P. On the rear portion of the head, A, is a bracket, C⁶, through which the link, C⁵, extends, and above said bracket, said link is surrounded by an expanding coiled spring, C⁷, and above said spring is a cross pin, C⁸, extending through said link. When the pedal is free, said spring pushes the link, C⁵, and the arm, C³, upward, whereby the clutch member, C², is drawn away from the pulley clutch member, C¹. This construction provides for the driving of the machine only so long as the operator depresses the pedal, P.

I claim as my invention:

1. In a machine of the nature described, the combination of a reciprocatory cutter, rotatable feed mechanism supports having an axis perpendicular to the feed plane and adapted for turning in unison on said axis, feed members located on said supports for supporting and feeding a sheet between them, and means for actuating one of said feed members, substantially as described.

2. In a machine of the nature described, the combination of a reciprocatory cutter, rotatable feed mechanism supports having axis perpendicular to the feed plane and adapted for turning in unison on said axis, two feed members for supporting and feeding a sheet, one of said feed members being on one and the other on the other of said supports and one of said feed members standing in opposition to the other, and means for actuating one of said feed members, substantially as described.

3. In a machine of the nature described, the combination of a reciprocatory cutter, rotatable feed mechanism supports having an axis perpendicular to the feed plane and adapted for turning in unison on said axis, feed members located on said supports for supporting and feeding a sheet between them, means for actuating one of said feed members, and means controllable by the operator for turning said supports in unison, substantially as described.

4. In a machine of the nature described, the combination of a reciprocatory cutter, rotatable feed mechanism supports having an axis perpendicular to the feed plane and adapted for turning in unison on said axis, two feed members for supporting and feeding a sheet, one of said feed members being on one and the other on the other of said supports and one of said feed members standing in opposition to the other, means for actuating one of said feed members, and means controllable by the operator for turning said supports in unison, substantially as described.

5. In a machine of the nature described, the combination of an upper reciprocatory cutter, a lower cutter, rotatable feed mechanism supports, having an axis perpendicular to the feed plane and adapted for turning in unison on said axis, feed members located on said supports for supporting and feeding a sheet between them, and means for actuating one of said feed members, substantially as described.

6. In a machine of the nature described, the combination of an upper reciprocatory cutter, a lower cutter, rotatable feed mechanism supports having an axis perpendicular to the feed plane and adapted for turning in unison on said axis, two feed members for supporting and feeding a sheet, one of said feed members being on one and the other on the other of said supports and one of said feed members standing in opposition to the other, and means for actuating one of said feed members, substantially as described.

7. In a machine of the nature described, the combination of an upper reciprocatory cutter, a lower cutter, rotatable feed mechanism supports having an axis perpendicular to the feed plane and adapted for turning in unison on said axis, feed members located on said supports for supporting and feeding a sheet between them, means for actuating one of said feed members, and means controllable by the operator for turning said supports in unison, substantially as described.

8. In a machine of the nature described, the combination of an upper reciprocatory cutter, a lower cutter, rotatable feed mechanism supports having an axis perpendicular to the feed plane and adapted for turning in unison on said axis, two feed members for supporting and feeding a sheet, one of said feed members being on one and the other on the other of said supports and one of said feed members standing in opposition to the other, means for actuating one of said feed members, and means controllable by the operator for turning said supports in unison, substantially as described.

9. In a machine of the nature described, the combination of a reciprocatory cutter, two feed members for supporting and feeding a sheet between them, and means for turning said feed members and said cutter on an axis perpendicular to the plane of said sheet, substantially as described.

10. In a machine of the nature described, the combination of a reciprocatory cutter, two feed members for supporting and feeding a sheet between them, and means controllable by the operator for simultaneously turning said feed members and said cutter on an axis perpendicular to the plane of said sheet, substantially as described.

11. In a machine of the nature described, the combination of an upper reciprocatory cutter, a lower cutter, two feed members for supporting and feeding a sheet between them, and means for turning said feed members and said cutters on an axis which is perpendicular to the plane of said sheet, substantially as described.

12. In a machine of the nature described, the combination of an upper reciprocatory cutter, a lower cutter, two members, standing in opposition to each other and adapted to receive a sheet between them and one being driven, for supporting and feeding said sheet, and means for turning said feed members and said cutters on an axis which is perpendicular to the plane of said sheet, substantially as described.

13. In a machine of the nature described, the combination of an upper reciprocatory cutter, a lower cutter, two feed members for supporting and feeding a sheet between them, and means controllable by the operator for simultaneously turning said feed members and said cutters on an axis perpendicular to the sheet plane, substantially as described.

14. In a machine of the nature described, the combination of an upper reciprocatory cutter, a lower cutter, two members, standing in opposition to each other and adapted to receive a sheet between them, and one being driven, for supporting and feeding said sheet, and means controllable by the operator for simultaneously turning said feed members and said cutters, substantially as described.

15. In a machine of the nature described, the combination of a rotatable, reciprocatory upper cutter, two supports rotatable on an axis parallel to the path of said reciprocatory cutter and one of said supports surrounding and engaging said reciprocatory cutter for the rotation of said cutter with said support, and feed members supported by said supports, substantially as described.

16. In a machine of the nature described, the combination of a rotatable, reciprocatory upper cutter, two supports rotatable on an axis parallel to the path of said reciprocatory cutter and one of said supports surrounding and engaging said reciprocatory cutter for the rotation of said cutter with said support, feed members supported by said supports, and means controllable by the operator for simultaneously turning said supports on said axis, substantially as described.

17. In a machine for cutting sheet metal, the combination of a reciprocatory cutter having lateral cutting edge portions extending to two lines which are parallel to each other and to the course of the sheet, and two members, standing in opposition to each other and adapted to receive a metal sheet between them and one being driven, for supporting and feeding said metal sheet and forming a turning point therefor near the path of the reciprocatory cutter, and means for rotating said feed members on an axis which is perpendicular to the sheet plane, substantially as described.

18. In a machine for cutting sheet metal, the combination of a reciprocatory cutter having lateral cutting edge portions extending to two lines which are parallel to each other and to the course of the sheet, two members, standing in opposition to each other and adapted to receive the metal sheet between them and one being driven, for feeding said metal sheet and forming a turning point therefor close to the path of the reciprocatory cutter, and sheet supporting means at each side of the space inclosed between said two parallel lines and adjacent the path of the reciprocatory cutter, and means for rotating said feed members on an axis which is perpendicular to the sheet plane, substantially as described.

19. In a machine for cutting sheet metal, the combination of a reciprocatory cutter having lateral cutting edge portions extending to two lines which are parallel to each other and to the course of the sheet, two members, standing in opposition to each other and adapted to receive the metal sheet between them and one being driven, for feeding said metal sheet and forming a turning point therefor close to the path of the reciprocatory cutter, and a lower cutter below the sheet plane and extending to each side of the space inclosed between said two parallel lines adjacent the path of the reciprocatory cutter, and means for rotating said feed members on an axis which is perpendicular to the sheet plane, substantially as described.

20. In a machine for cutting sheet metal, the combination of two members, standing in opposition to each other and adapted to receive a metal sheet between them and one being driven, for constantly supporting and frictionally engaging and feeding said metal sheet and forming a turning point therefor, and a reciprocatory cutter having a path passing through the plane of said sheet near said turning point and having lateral cutting edge portions extending to two lines which are parallel to each other and to the course of the sheet, and means for rotating said feed members on an axis which is perpendicular to the sheet plane, substantially as described.

21. In a machine for cutting sheet metal, the combination of two members, standing in opposition to each other and adapted to receive a metal sheet between them and one being driven, for constantly supporting and frictionally engaging and feeding said metal sheet and forming a turning point therefor, a reciprocatory cutter having a path passing through the plane of said sheet near said turning point, a lower cutter located below the sheet plane and at the level of the upper portion of the lower feed member and close to said path and having lateral cutting edge portions extending to two lines which are parallel to each other and to the course of the sheet, and means for rotating said feed members on an axis which is perpendicular to the sheet plane, substantially as described.

22. In a machine for cutting sheet metal, the combination of two members, standing in opposition to each other and adapted to receive a metal sheet between them and one being rotary and driven, for supporting and feeding said metal sheet and forming a turning point therefor, a reciprocatory cutter having a path passing through the plane of said sheet near said turning point and having lateral cutting edge portions extending to two lines which are parallel to each other and to the course of the sheet, and means for rotating said feed members on an axis which is perpendicular to the sheet plane, substantially as described.

23. In a machine for cutting sheet metal, the combination of two members, standing in opposition to each other and adapted to receive a metal sheet between them and one being rotary and driven, for supporting and feeding said metal sheet and forming a turning point therefor, a reciprocatory cutter having a path passing through the plane of said sheet near said turning point and having lateral cutting edge portions extending to two lines which are parallel to each other and to the course of the sheet, a stationary cutter located below the sheet plane and at the level of the upper portion of the lower feed member and close to said path, and means for rotating said feed members on an axis which is perpendicular to the sheet plane, substantially as described.

24. In a machine for cutting sheet metal, the combination of two rotary members, standing in opposition to each other and adapted to receive a metal sheet between them and one being driven, for supporting and feeding said metal sheet and forming a turning point therefor, a reciprocatory cutter having a path passing through the plane of said sheet near said turning point and having lateral cutting edge portions extending to two lines which are parallel to each other and to the course of the sheet, and means for rotating said feed members on an axis which is perpendicular to the sheet plane, substantially as described.

25. In a machine for cutting sheet metal, the combination of two rotary members, standing in opposition to each other and adapted to receive a metal sheet between them and one being driven, for supporting and feeding said metal sheet and forming a turning point therefor, a reciprocatory cutter having a path passing through the plane of said sheet near said turning point and having lateral cutting edge portions extending to two lines which are parallel to each other and to the course of the sheet, a stationary cutter located below the sheet plane and at the level of the upper portion of the lower rotary feed member and close to said path, and means for rotating said feed members on an axis which is perpendicular to the sheet plane, substantially as described.

26. In a machine for cutting sheet metal, the combination of two rotary members, standing in opposition to each other and adapted to receive a metal sheet between them and one being driven, for constantly supporting and frictionally engaging and feeding said metal sheet and forming a turning point therefor, a reciprocatory cutter having a path passing through the plane of said sheet near said turning point and having lateral cutting edge portions extending to two lines which are parallel to each other and to the course of the sheet, and means for rotating said feed members on an axis which is perpendicular to the sheet plane, substantially as described.

27. In a machine for cutting sheet metal, the combination of two rotary members, standing in opposition to each other and adapted to receive a metal sheet between them and one being driven, for constantly supporting and frictionally engaging and feeding said metal sheet and forming a turning point therefor, a reciprocatory cutter having a path passing through the plane of said sheet near said turning point and having lateral cutting edge portions extending to two lines which are parallel to each other and to the course of the sheet, a stationary cutter located below the sheet plane and at the level of the upper portion of the lower feed member and close to said path, and means for rotating said feed members on an axis which is perpendicular to the sheet plane, substantially as described.

28. In a machine for cutting sheet metal, the combination of a stationary cutting member, adjusting screws at each side of said member, a reciprocatory cutting member having lateral cutting edge portions extending to two lines which are parallel to each other and to the course of the sheet, feed members for engaging a sheet and forming a turning point therefor close to the cutting edge of the stationary cutting member, and means for rotating said feed members on an axis which is perpendicular to the sheet plane, substantially as described.

29. In a machine for cutting sheet metal, the combination of a reciprocatory cutting member having lateral cutting edge portions extending to two lines which are parallel to each other and to the course of the sheet, fixed guides for said member, two feed rollers having their axes parallel to each other and perpendicular to the path of the reciprocatory cutter, a stationary cutting member adjustable in a course parallel to the axes of said feed rollers, and means for rotating said feed members on an axis which is perpendicular to the sheet plane, substantially as described.

30. In a machine for cutting sheet metal, the combination of a reciprocatory cutting member having lateral cutting edge portions extending to two lines which are parallel to each other and to the course of the sheet, fixed guides for said member, two feed rollers having their axes parallel to each other and perpendicular to the path of the reciprocatory cutter, and the lower of said rollers being adjustable in a course parallel to its axis, a stationary cutting member adjustable in a course parallel to the axes of said feed rollers, and means for rotating said feed members on an axis which is perpendicular to the sheet plane, substantially as described.

31. In a machine for cutting sheet metal, the combination of a reciprocatory cutting member having lateral cutting edge portions extending to two lines which are parallel to each other and to the course of the sheet, a lower feed roller, a shaft supporting said roller, a fixed support, and a stationary cutting member supported by said support and by said shaft, and means for rotating said feed members on an axis which is perpendicular to the sheet plane, substantially as described.

32. In a machine for cutting sheet metal, the combination of cutting members, a pair of feed rollers, power-actuated means for driving said cutting members and said rollers, and a means controllable by the operator and in operative relation with said actuating means and said rollers for setting said actuating means into operation and moving said rollers toward each other, and means for rotating said feed members on an axis which is perpendicular to the sheet plane, substantially as described.

33. In a machine for cutting sheet metal, the combination of feed members for engaging the faces of a metal sheet and forming a turning point and adapted to cut and move the sheet metal out of the sheet plane between parallel lines which are parallel to the course of feed of the sheet, and means for rotating said feed members on an axis which is perpendicular to the sheet plane, substantially as described.

34. In a machine for cutting sheet metal, the combination of rotary feed members for engaging the faces of a metal sheet and forming a turning point therefor, and cutting members located close to said turning point and adapted to cut and move the sheet metal out of the sheet plane between parallel lines which are parallel to the course of feed of the sheet, and means for rotating said feed members on an axis which is perpendicular to the sheet plane, substantially as described.

35. In a machine for cutting sheet metal, the combination of feed members for engaging the faces of a metal sheet and forming a turning point therefor, and a stationary cutting member and a reciprocatory cutting member located close to said turning point and adapted to cut and move the sheet metal out of the sheet plane between parallel lines which are parallel to the course of feed of the sheet, and means for rotating said feed members on an axis which is perpendicular to the sheet plane, substantially as described.

36. In a machine for cutting sheet metal, the combination of rotary feed members for engaging the faces of a metal sheet and forming a turning point therefor, and a stationary cutting member and a reciprocatory cutting member located close to said turning point and adapted to cut and move the sheet metal out of the sheet plane between parallel lines which are parallel to the course of feed of the sheet, and means for rotating said feed members on an axis which is perpendicular to the sheet plane, substantially as described.

37. In a machine for cutting sheet metal, the combination of a reciprocatory cutter having lateral cutting edge portions extending to two lines which are parallel to each other and to the course of the sheet, two members, standing in opposition to each other and adapted to receive a metal sheet between them and one being driven, for supporting and feeding said metal sheet and forming a turning point therefor near the path of the reciprocatory cutter, and means controllable by the operator for rotating said feed members and said cutter on an axis which is perpendicular to the sheet plane, substantially as described.

38. In a machine for cutting sheet metal, the combination of a reciprocatory cutter having lateral cutting edge portions extending to two lines which are parallel to each other and to the course of the sheet, two members, standing in opposition to each other and adapted to receive the metal sheet between them and one being driven, for feeding said metal sheet and forming a turning point therefor close to the path of the reciprocatory cutter, sheet supporting means at each side of the space inclosed between said two parallel lines and adjacent the path of the reciprocatory cutter, and means controllable by the operator for rotating said feed members and said cutters on an axis which is perpendicular to the sheet plane, substantially as described.

39. In a machine for cutting sheet metal, the combination of a reciprocatory cutter having lateral cutting edge portions extending to two lines which are parallel to each other and to the course of the sheet, two members, standing in opposition to each other and adapted to receive the metal sheet between them and one being driven, for feeding said metal sheet and forming a turning point therefor close to the path of the reciprocatory cutter, a lower cutter located below the sheet plane and extending to each side of the space inclosed between said two parallel lines adjacent the path of the reciprocatory cutter, and means controllable by the operator for rotating said feed members and said cutter on an axis which is perpendicular to the sheet plane, substantially as described.

40. In a machine for cutting sheet metal, the combination of two members, standing in opposition to each other and adapted to receive a metal sheet between them and one being driven, for constantly supporting and frictionally engaging and feeding said metal sheet and forming a turning point therefor, a reciprocatory cutter having a path passing through the plane of said sheet near said turning point and having lateral cutting edge portions extending to two lines which are parallel to each other and to the course of the sheet, and means controllable by the operator for rotating said feed members and said cutter on an axis which is perpendicular to the sheet plane, substantially as described.

41. In a machine for cutting sheet metal, the combination of two members, standing in opposition to each other and adapted to receive a metal sheet between them and one being driven, for constantly supporting and frictionally engaging and feeding said metal sheet and forming a turning point therefor, a reciprocatory cutter having a path passing through the plane of said sheet near said turning point, a lower cutter located below the sheet plane and at the level of the upper portion of the lower feed member and close to said path and having lateral cutting edge portions extending to two lines which are parallel to each other and to the course of the sheet, and means controllable by the operator for rotating said feed members and said cutter on an axis which is perpendicular to the sheet plane, substantially as described.

42. In a machine for cutting sheet metal, the combination of two members, standing in opposition to each other and adapted to receive a metal sheet between them and one being rotary and driven, for supporting and feeding said metal sheet and forming a turning point therefor, a reciprocatory cutter having a path passing through the plane of said sheet near said turning point and having lateral cutting edge portions extending to two lines which are parallel to each other and to the course of the sheet, and means controllable by the operator for rotating said feed members and said cutter on an axis which is perpendicular to the sheet plane, substantially as described.

43. In a machine for cutting sheet metal, the combination of two members, standing in opposition to each other and adapted to receive a metal sheet between them and one being rotary and driven, for supporting and feeding said metal sheet and forming a turning point therefor, a reciprocatory cutter having a path passing through the plane of said sheet near said turning point, and having lateral cutting edge portions extending to two lines which are parallel to each other and to the course of the sheet, a stationary cutter located below the sheet plane and at the level of the upper portion of the lower feed member and close to said path, and means controllable by the operator for rotating said feed members and said cutters on an axis which is perpendicular to the sheet plane, substantially as described.

44. In a machine for cutting sheet metal, the combination of two rotary members, standing in opposition to each other and adapted to receive a metal sheet between them and one being driven, for supporting and feeding said metal sheet and forming a turning point therefor, a reciprocatory cutter having a path passing through the plane of said sheet near said turning point and having lateral cutting edge portions extending to two lines which are parallel to each other and to the course of the sheet, and means controllable by the operator for rotating said feed members and said cutter on an axis which is perpendicular to the sheet plane, substantially as described.

45. In a machine for cutting sheet metal, the combination of two rotary members, standing in opposition to each other and adapted to receive a metal sheet between them and one being driven, for supporting and feeding said metal sheet and forming a turning point therefor, a reciprocatory cutter having a path passing through the plane of said sheet near said turning point and having lateral cutting edge portions extending to two lines which are parallel to each other and to the course of the sheet, a stationary cutter located below the sheet plane and at the level of the upper portion of the lower rotary feed member and close to said path, and means controllable by the operator for rotating said feed members and said cutters on an axis which is perpendicular to the sheet plane, substantially as described.

46. In a machine for cutting sheet metal, the combination of two rotary members, standing in opposition to each other and adapted to receive a metal sheet between them and one being driven, for constantly supporting and frictionally engaging and feeding said metal sheet and forming a turning point therefor, a reciprocatory cutter having a path passing through the plane of said sheet near said turning point and having lateral cutting edge portions extending to two lines which are parallel to each other and to the course of the sheet, and means controllable by the operator for rotating said feed members and said cutter on an axis which is perpendicular to the sheet plane, substantially as described.

47. In a machine for cutting sheet metal, the combination of two rotary members, standing in opposition to each other and adapted to receive a metal sheet between them and one being driven, for constantly supporting and frictionally engaging and feeding said metal sheet and forming a turning point therefor, a reciprocatory cutter having a path passing through the plane of said sheet near said turning point and having lateral cutting edge portions extending to two lines which are parallel to each other and to the course of the sheet, a stationary cutter located below the sheet plane and at the level of the upper portion of the lower feed member and close to said path, and means controllable by the operator for rotating said feed members and said cutters on an axis which is perpendicular to the sheet plane, substantially as described.

48. In a machine for cutting sheet metal, the combination of a stationary cutting member, adjusting screws at each side of said member, a reciprocatory cutting member having lateral cutting edge portions extending to two lines which are parallel to each other and to the course of the sheet, feed members for engaging a sheet and forming a turning point therefor close to the cutting edge of the stationary cutting member, and means controllable by the operator for rotating said feed members and said cutter on an axis which is perpendicular to the sheet plane, substantially as described.

49. In a machine for cutting sheet metal, the combination of a reciprocatory cutting member having lateral cutting edge portions extending to two lines which are parallel to each other and to the course of the sheet, fixed guides for said member, two feed rollers having their axes parallel to each other and perpendicular to the path of the reciprocatory cutter, a stationary cutting member adjustable in a course parallel to the axes of said feed rollers, and means controllable by the operator for rotating said feed members and said cutters on an axis which is perpendicular to the sheet plane, substantially as described.

50. In a machine for cutting sheet metal, the combination of a reciprocatory cutting member having lateral cutting edge portions extending to two lines which are parallel to each other and to the course of the sheet, fixed guides for said member, two feed rollers having their axes parallel to each other and perpendicular to the path of the reciprocatory cutter, the lower of said rollers being adjustable in a course parallel to its axis, a stationary cutting member adjustable in a course parallel to the axes of said feed rollers, and means controllable by the operator for rotating said feed members and said cutters on an axis which is perpendicular to the sheet plane, substantially as described.

51. In a machine for cutting sheet metal, the combination of a reciprocatory cutting member having lateral cutting edge portions extending to two lines which are parallel to each other and to the course of the sheet, a lower feed roller, a shaft supporting said roller, a fixed support, a stationary cutting member supported by said support and by said shaft, and means controllable by the operator for rotating said feed members and said cutters on an axis which is perpendicular to the sheet plane, substantially as described.

52. In a machine for cutting sheet metal, the combination of cutting members, a pair of feed rollers, power-actuated means for driving said cutting members and said rollers, a means controllable by the operator and in operative relation with said actuating means and said rollers for setting said actuating means into operation and moving said rollers toward each other, and means controllable by the operator for rotating said feed members and said cutter on an axis which is perpendicular to the sheet plane, substantially as described.

53. In a machine for cutting sheet metal, the combination of feed members for engaging the faces of a metal sheet and forming a turning point therefor, and cutting members located close to said turning point and adapted to cut and move the sheet metal out of the sheet plane between parallel lines which are parallel to the course of feed of the sheet, and means controllable by the operator for rotating said feed member and said cutting member on an axis which is perpendicular to the sheet plane, substantially as described.

54. In a machine for cutting sheet metal, the combination of rotary feed members for engaging the faces of a metal sheet and forming a turning point therefor, cutting members located close to said turning point and adapted to cut and move the sheet metal out of the sheet plane between parallel lines which are parallel to the course of feed of the sheet, and means controllable by the operator for rotating said feed members and said cutting members on an axis which is perpendicular to the sheet plane, substantially as described.

55. In a machine for cutting sheet metal, the combination of feed members for engaging the faces of a metal sheet and forming a turning point therefor, a stationary cutting member and a reciprocatory cutting member located close to said turning point and adapted to cut and move the sheet metal out of the sheet plane between parallel lines which are parallel to the course of feed of the sheet, and means controllable by the operator for rotating said feed members and said cutting members on an axis which is perpendicular to sheet plane, substantially as described.

56. In a machine for cutting sheet metal, the combination of rotary feed members for engaging the faces of a metal sheet and forming a turning point therefor, and a stationary cutting member and a reciprocatory cutting member located close to said turning point and adapted to cut and move the sheet metal out of the sheet plane between parallel lines which are parallel to the course of the feed of the sheet, and means controllable by the operator for rotating said feed members and said cutting members on an axis which is perpendicular to the sheet plane, substantially as described.

57. In a machine of the nature described, the combination of a reciprocatory cutter, rotatable feed mechanism supports having an axis perpendicular to the feed plane, feed members located on said supports for supporting and feeding a sheet between them, a rotatable shaft, and means connecting said feed mechanism supports for rotation with said shaft, substantially as described.

58. In a machine of the nature described, the combination of a reciprocatory cutter, rotatable feed mechanism supports having an axis perpendicular to the feed plane, feed members located on said supports for supporting and feeding a sheet between them, a rotatable shaft, and means on said shaft to be engaged by the operator for turning said shaft, substantially as described.

59. In a machine of the nature described, the combination of a reciprocatory cutter, rotatable feed mechanism supports having an axis perpendicular to the feed plane, feed members located on said supports for supporting and feeding a sheet between them, a rotatable shaft, and chains connecting said shaft with said rotatable feed mechanism supports for rotation with said shaft, substantially as described.

60. In a machine of the nature described, the combination of a cutter, a reciprocatory holder for said cutter, a rotatable feed mechanism support surrounding said holder, feed mechanism on said support, a second rotatable feed mechanism support in axial alinement with the first feed mechanism support, feed mechanism on said second support, and means for moving said feed mechanism supports toward each other, substantially as described.

61. In a machine of the nature described, the combination of a cutter, a reciprocatory holder for said cutter, a rotatable feed mechanism support surrounding said holder, feed mechanism on said support, a second rotatable feed mechanism support in axial alinement with the first feed mechanism support, feed mechanism on said second support, and means for moving the first feed mechanism support toward the second feed mechanism support, substantially as described.

62. In a machine of the nature described, the combination of a reciprocatory cutter, rotatable feed mechanism supports having an axis perpendicular to the sheet plane and adapted for turning in unison on said axis, feed members located on said supports for supporting and feeding a sheet between them, and means independent of the rotation of said rotatable supports for periodically engaging and actuating said feed mechanism, substantially as described.

63. In a machine of the nature described, the combination of mechanism for supporting and feeding a sheet, a cross-head reciprocatory perpendicularly to the sheet plane, a cutter holder supported by and rotatable on said cross head, a cutter on said cutter holder, means for reciprocating said cross head, and means controllable by the operator for turning said cutter holder, substantially as described.

64. In a machine of the nature described, the combination of mechanism for supporting and feeding a sheet, a reciprocatory cutter perpendicular to the sheet plane, a rotatable holder for said cutter, a cross head engaging said holder to permit rotation of the latter, a crank for reciprocating said the latter, a crank for reciprocating said cross head, and means controllable by the operator for turning said cutter holder, substantially as described.

65. In a machine of the nature described, the combination of a reciprocatory cutter, rotatable feed mechanism supports having an axis perpendicular to the sheet plane and adapted for turning in unison on said axis, feed members located on said supports for supporting and feeding a sheet between them, gearing located on one of said supports and in operative relation with the feed mechanism on said support, gear mechanism adjacent said support, and automatic means located adjacent said support for periodically engaging and actuating said gear mechanism, substantially as described.

66. In a machine of the nature described, the combination of a reciprocatory cutter, rotatable feed mechanism supports having an axis perpendicular to the feed plane, feed members on said supports, gearing adjacent one of said feed members and adapted to actuate the latter, a constantly-rotating member, and means leading from said constantly-rotating member to said gearing and periodically engaging and actuating the latter, substantially as described.

67. In a machine of the nature described, the combination of a reciprocatory cutter, rotatable feed mechanism supports having an axis perpendicular to the feed plane, feed members on said supports, a gear ring loosely surrounding one of said supports and in operative relation with the feed member on said support, a constantly-rotating member, and means leading from said constantly-rotating member to said gear ring and periodically engaging and partially rotating said ring, substantially as described.

68. In a machine of the nature described, the combination of a reciprocatory cutter, rotatable feed mechanism supports having an axis perpendicular to the sheet plane and adapted for turning in unison on said axis, feed members located on said supports for supporting and feeding a sheet between them, gearing located on each support and in operative relation with the feed mechanism on said supports, gear mechanism adjacent each support, and automatic means located adjacent each support for periodically engaging and actuating said gear mechanism, substantially as described.

69. In a machine of the nature described, the combination of a reciprocatory cutter, two rotatable feed mechanism supports having an axis perpendicular to the sheet plane and adapted for turning in unison on said axis, feed members located on said supports for supporting and feeding a sheet between them, gearing in operative relation with the feed member on one of said supports and comprising a ring which surrounds said support, and a gripping shoe, and means for supporting and periodically moving said shoe for making engagement with and partially rotating said ring, substantially as described.

70. In a machine of the nature described, the combination of a reciprocatory cutter, two rotatable feed mechanism supports having an axis perpendicular to the sheet plane and adapted for turning in unison on said axis, feed members located on said supports for supporting and feeding a sheet between them, two gearings, one in operative relation with the feed member on one of said supports and the other in operative relation with the feed member on the other of said supports and each comprising a ring which surrounds the adjacent support, gripping shoes, and means for supporting and periodically moving said shoes for engagement with and partially rotating said rings, substantially as described.

71. In a machine of the nature described, the combination of a reciprocatory cutter, two rotatable mechanism supports having an axis perpendicular to the sheet plane and adapted for turning in unison on said axis, feed members located on said supports for supporting and feeding a sheet between them, gearing in operative relation with the feed member on one of said supports and comprising a ring which surrounds said support, a shiftable gripping shoe support, a gripping shoe on said support, and means for periodically moving said shoe for making engagement with and partially rotating said ring, substantially as described.

72. In a machine of the nature described, the combination of a reciprocatory cutter, two rotatable mechanism supports having an axis perpendicular to the sheet plane and adapted for turning in unison on said axis, feed members located on said supports for supporting and feeding a sheet between them, gearing in operative relation with the feed member on one of said supports and comprising a ring which surrounds said support, a shiftable gripping shoe support, a gripping shoe seated on and movable with said support toward and from said ring, a second gripping shoe movable toward and from said ring, independently of said gripping shoe support, and means for periodically moving said second shoe and said shoe support for causing said shoes to engage and partially rotate said ring, substantially as described.

73. In a machine of the nature described, the combination of two feed mechanism supports, both of which are rotatable on the same axial line and of which is reciprocable on said line, constantly-acting means tending to move said one support end-wise along said line in one direction, means controllable by the operator for moving said support in the opposite direction, feed mechanism on said supports, and means for actuating said feed mechanism, substantially as described.

74. In a machine of the nature described, the combination of two feed mechanism supports, both of which are rotatable on the same axial line and one of which is reciprocable on said line, constantly-acting means tending to move said one support endwise along said line in one direction, means controllable by the operator for moving said support in the opposite direction, feed mechanism on said supports, and means for actuating said feed mechanism, substantially as described.

75. In a machine of the nature described, the combination of two feed mechanism supports, both of which are rotatable on the same axial line and one of which is reciprocable on said line, constantly-acting means tending to move said one support endwise along said line toward the other of said supports, means controllable by the operator for moving said reciprocable support in the opposite direction, feed mechanism on said supports, and means for actuating said feed mechanism, substantially as described.

76. In a machine of the nature described, the combination of two feed mechanism supports, both of which are rotatable on the same axial line and one of which is reciprocable on said line, a spring tending to move said one support endwise along said line in one direction, means controllable by the operator for moving said support in the opposite direction, feed mechanism on said supports, and means for actuating said feed mechanism, substantially as described.

77. In a machine of the nature described, the combination of two feed mechanism supports, both of which are rotatable on the same axial line and one of which is reciprocable on said line, a spring tending to move said one support endwise along said line toward the other of said supports, means controllable by the operator for moving said reciprocable support in the opposite direction, feed mechanism on said supports, and means for actuating said feed mechanism, substantially as described.

78. In a machine of the nature described, a cutting tool, a reciprocatory tool holder supporting said tool, a rotatable feed mechanism support surrounding said holder, feed mechanism on said support, a second rotatable support axially in line with the first-mentioned rotatable support, feed mechanism located on said support, and a cutter located upon and stationary relative to said support, substantially as described.

79. In a machine of the nature described, a cutting tool, a reciprocatory tool holder supporting said tool, a rotatable feed mechanism support surrounding said holder, feed mechanism on said support, a second rotatable support axially in line with the first-mentioned rotatable support, and a rotary cutter supported by said second rotatable support in position for acting with said cutting tool, substantially as described.

80. In a machine of the nature described, a cutting tool, a reciprocatory tool holder supporting said tool, a rotatable feed mechanism support surrounding said holder, feed mechanism on said support, a second rotatable support axially in line with the first-mentioned rotatable support, and a rotary cutter supported by said second rotatable support in position for acting with said cutting tool and with the feed mechanism on the first-mentioned feed mechanism support, substantially as described.

81. In a machine of the nature described, a cutting tool, a reciprocatory tool holder supporting said tool, a rotatable feed mechanism support surrounding said holder, feed mechanism on said support, a second rotatable support axially in line with the first-mentioned rotatable support, and two rotary cutters supported by said second rotatable support in position for acting with said cutting tool, substantially as described.

82. In a machine of the nature described, a cutting tool, a reciprocatory tool holder supporting said tool, a rotatable feed mechanism support surrounding said holder, feed mechanism on said support, a second rotatable support axially in line with the first-mentioned rotatable support, and two rotary cutters supported by said second rotatable support in position for acting with said cutting tool and with the feed mechanism on the first-mentioned feed mechanism, substantially as described.

83. In a machine of the nature described, the combination of a reciprocatory cutter, a feed mechanism support rotatable on an axis parallel to the path of said cutter, feed mechanism on said support for feeding a sheet in a plane to which said axis is perpendicular, feed mechanism actuating means normally out of connection with said feed mechanism and adapted for periodically moving to make connection with and actuate said feed mechanism, substantially as described.

84. In a machine of the nature described, the combination of a reciprocatory cutter, a feed mechanism support rotatable on an axis parallel to the path of said cutter, feed mechanism on said support for feeding a sheet in a plane to which said axis is perpendicular, a gripping shoe normally out of connection with said feed mechanism, and means for supporting and periodically moving said shoe for making connection with and actuating said feed mechanism, substantially as described.

85. In a machine of the nature described, the combination of an upper support and a lower support both rotatable on a common axis which is perpendicular to the sheet plane, mechanism extending to said two supports for rotating them in unison on said common axis, two cutting members working in opposition to each other and one being located on one of said supports and the other being located on the other of said supports for rotation on an axis perpendicular to the axis of said supports, and means for actuating one of said cutting members, substantially as described.

86. In a machine of the nature described, the combination of an upper support and a lower support both rotatable on a common axis which is perpendicular to the sheet plane, mechanism extending to said two supports for rotating them in unison on said common axis, and two members opposing each other and one being located on each of said supports for rotation on an axis which is parallel to the axis of the other of said members and perpendicular to the axis of said supports, and means for rotating one of said members, substantially as described.

In testimony whereof I have signed my name, in presence of two witnesses, this seventeenth day of April, in the year one thousand nine hundred and thirteen.

CHARLES B. GRAY.

Witnesses:
 CYRUS KEHR,
 ROY O. JOHNSTON.